United States Patent
Michaelides et al.

(10) Patent No.: US 12,470,097 B2
(45) Date of Patent: Nov. 11, 2025

(54) APPARATUS FOR AN ELECTRIC MACHINE

(71) Applicant: JAGUAR LAND ROVER LIMITED, Coventry (GB)

(72) Inventors: Alexandros Michaelides, Coventry (GB); Cleef Thackwell, Coventry (GB); Matthew Crouch, Coventry (GB); Jose Malumbres Ruiz, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 279 days.

(21) Appl. No.: 18/251,692

(22) PCT Filed: Nov. 3, 2021

(86) PCT No.: PCT/EP2021/080548
§ 371 (c)(1),
(2) Date: May 3, 2023

(87) PCT Pub. No.: WO2022/096527
PCT Pub. Date: May 12, 2022

(65) Prior Publication Data
US 2023/0421006 A1 Dec. 28, 2023

(30) Foreign Application Priority Data
Nov. 3, 2020 (GB) .................................. 2017413

(51) Int. Cl.
*H02K 1/27* (2022.01)
*H02K 1/276* (2022.01)
(52) U.S. Cl.
CPC ......... *H02K 1/276* (2013.01); *H02K 2213/03* (2013.01)
(58) Field of Classification Search
CPC .. H02K 1/276; H02K 2213/03; H02K 1/2766; H02K 1/278; H02K 21/16;
(Continued)

(56) References Cited

U.S. PATENT DOCUMENTS

| 2013/0093284 A1 | 4/2013 | Utaka |
| 2016/0013690 A1 | 1/2016 | Droit et al. |

(Continued)

FOREIGN PATENT DOCUMENTS

| CN | 104410234 A | 3/2015 |
| CN | 106329774 A | 1/2017 |

(Continued)

OTHER PUBLICATIONS

Great Britain Intellectual Property Office, Combined Search and Examination Report under Sections 17 and 18(3) Issued in Application No. GB2017413.2, Aug. 5, 2021, 9 pages.

(Continued)

*Primary Examiner* — Thomas Truong
(74) *Attorney, Agent, or Firm* — McCoy Russell LLP

(57) ABSTRACT

A rotor assembly for an electric machine has a rotor and magnets configured to form rotor poles that each have a central pole axis extending in a radial direction from a longitudinal axis. The rotor poles each have a first magnet layer having one or more first magnet including a central first magnet having a first transverse axis disposed perpendicular to the central pole axis. The rotor poles each have a second magnet layer radially inset from the first magnet layer and having two or more second magnets that include a pair of inclined second magnets each having a first transverse axis extending at an acute angle to the central pole axis. In relation to the central pole axis, a portion of each inclined second magnet is disposed inboard of an end of the central first magnet.

20 Claims, 9 Drawing Sheets

(58) Field of Classification Search
CPC ......... H02K 29/03; Y02T 10/64; Y02T 10/62; B60Y 2200/91; B60Y 2200/92
See application file for complete search history.

(56) References Cited

U.S. PATENT DOCUMENTS

2019/0165627 A1* 5/2019 Michaelides .......... H02K 1/278
2019/0238014 A1   8/2019 Kol et al.

FOREIGN PATENT DOCUMENTS

| | | |
|---|---|---|
| CN | 209545278 U | 10/2019 |
| CN | 111106686 A | 5/2020 |
| EP | 2012410 A1 | 1/2009 |
| JP | 2019187199 A | 10/2019 |
| WO | 2018210577 A1 | 11/2018 |
| WO | 2019174328 A1 | 9/2019 |
| WO | 2020027338 A1 | 2/2020 |
| WO | 2020191815 A1 | 10/2020 |

OTHER PUBLICATIONS

ISA European Patent Office, International Search Report and Written Opinion Issued in Application No. PCT/EP2021/080548, Feb. 28, 2022, WIPO, 45 pages.
Korean Intellectual Property Office, Office Action Issued in Application No. 10-2023-7017872, Sep. 25, 2024, 25 pages.

* cited by examiner

APPARATUS FOR AN ELECTRIC MACHINE

CROSS REFERENCE TO RELATED APPLICATIONS

The present application is a U.S. National Phase of International Application No. PCT/EP2021/080548 entitled "APPARATUS FOR AN ELECTRIC MACHINE," and filed on Nov. 3, 2021. International Application No. PCT/EP2021/080548 claims priority to Great Britain Patent Application No. 2017413.2 filed on Nov. 3, 2020. The entire contents of each of the above-listed applications are hereby incorporated by reference for all purposes.

TECHNICAL FIELD

The present disclosure relates to apparatus for an electric machine. More particularly, but not exclusively, the present disclosure relates to a rotor and a rotor assembly for an electric machine. The electric machine may, for example, be a traction motor for a vehicle, such as an automobile.

BACKGROUND

It is known to use one or more electric machine to propel a vehicle. The electric machine may be used instead of, or in addition to, an internal combustion engine. The vehicle may, for example, comprise a battery electric vehicle (BEV), a plug-in hybrid electric vehicle (PHEV) or a hybrid electric vehicle (HEV). It is desirable to improve the torque density and/or the efficiency of the electric machine. This may enable improved vehicle range and/or efficiency. At least in certain embodiments the present invention seeks to provide an improved electric machine.

SUMMARY OF THE INVENTION

Aspects of the present invention relate to a rotor assembly, an electric machine and a vehicle as claimed in the appended claims.

According to an aspect of the present invention there is provided a rotor assembly for an electric machine, the rotor assembly comprising a rotor and a plurality of magnets, the magnets being configured to form a plurality of rotor poles and each rotor pole having a central pole axis extending in a radial direction from a longitudinal axis of the rotor; wherein each rotor pole comprises: a first magnet layer comprising one or more first magnet, the one or more first magnet comprising a central first magnet having a first transverse axis disposed substantially perpendicular to the central pole axis; a second magnet layer radially inset from the first magnet layer and comprising two or more second magnets, the second magnets comprising a pair of inclined second magnets each having a first transverse axis extending at an acute angle to the central pole axis.

At least in certain embodiments, each rotor pole may be configured such that, in relation to the central pole axis, a portion of each of the inclined second magnets is disposed inboard of an end of the one or more central first magnet to form an overlapping arrangement.

The first magnet layer may be disposed in a radially outermost position. The second magnet layer may be disposed in a radially innermost position. One or more magnet layer may be disposed between the first magnet layer and the second magnet layer. For example, a third magnet layer may be disposed between the first magnet layer and the second magnet layer.

A spacing between the inclined second magnets in a direction perpendicular to the central pole axis may be less than or equal to the transverse dimension of the one or more first magnet. At least in certain embodiments, this overlapping arrangement may help to control the magnetic flux in the air gap between the rotor assembly and the stator assembly. This arrangement may, for example, reduce interruptions or discontinuities in the magnetic flux present in the air gap. The resulting magnetic flux established in the air gap may change progressively in a circumferential direction across the or each rotor pole. At least in certain embodiments, the topology of the permanent magnets in each rotor pole generates a magnetic flux in the air gap having a magnitude which is generally sinusoidal in form. The magnitude of the magnetic flux may, for example, be greatest at or proximal to the central pole axis (corresponding to a direct axis of the rotor pole); and smallest at or proximal to the quadrature axis of the rotor pole. The magnitude of the magnetic flux in the air gap may be substantially zero at the quadrature axis. This sinusoidal variation in the magnitude of the magnetic flux is repeated for each of the rotor poles. At least in certain embodiments, this may improve operating characteristics of the electric machine.

The topology of the magnets in the rotor is defined herein. The topology is defined in respect of the number of pairs of rotor poles (referred to herein as pole pairs) present in the rotor. It will be understood that the topology is applicable to rotors having different numbers of rotor poles. For example, the rotor may have six (6) rotor poles (i.e. three (3) pole pairs); or the rotor may have eight (8) rotor poles (i.e. four (4) pole pairs). By way of example, the number of pole pairs (p) may be one of the following set: three (3); four (4); five (5) and six (6). Unless indicated to the contrary the definitions and equations detailed herein are applicable to the different rotor configurations.

The central first magnet comprises opposing first and second ends. A first central angle is formed between two first radial lines extending from the longitudinal axis and coincident with the first and second ends respectively of the central first magnet. The first central angle may be defined by the equation:

$$A1 > \frac{1}{4} \cdot \frac{360}{2p}$$

where A1 is the first central angle; and p is the number of pole pairs in the rotor.

A corner or edge of the central first magnet may be coincident with the respective first radial lines.

The first central angle may be defined by the equation:

$$A1 < \frac{1}{2} \cdot \frac{360}{2p}$$

where A1 is the first central angle; and p is the number of pole pairs in the rotor.

The first central angle may be defined by the equation:

$$A1 < \frac{68}{p}$$

where A1 is the first central angle; and p is the number of pole pairs in the rotor.

Alternatively, or in addition, the first central angle may be defined by the equation:

$$\frac{1}{4} \cdot \frac{360}{2p} < A1$$

where A1 is the first central angle; and p is the number of pole pairs in the rotor.

Alternatively, or in addition, the first central angle may be defined by the equation:

$$\frac{60}{p} < A1$$

where A1 is the first central angle; and p is the number of pole pairs in the rotor.

The rotor may, for example, comprise four (4) pole pairs. The first central angle may be in the range 11.25° to 22.5°, inclusive. The first central angle may be in the range 15° to 17°, inclusive. The first central angle may be defined as 16°±1°. The first central angle may be approximately 16°, for example.

Each inclined second magnet may have an inner end (disposed proximal to the central pole axis). Two inner radial lines may be defined extending from the longitudinal axis of the rotor and coincident with the inner ends of the inclined second magnets. An inner second central angle may be formed between the two inner radial lines. The inner second central angle may be defined by the equation:

$$A3I < \frac{88}{p}$$

where A3I is the inner second central angle; and p is the number of pole pairs in the rotor.

The inner second central angle may be defined by the equation:

$$A3I < \frac{80}{p}$$

where A3I is the inner second central angle; and p is the number of pole pairs in the rotor.

An inboard corner or edge of each inclined second magnet may be coincident with the two inner radial lines. An inboard corner or edge of a first one of the inclined second magnet may be disposed on a first one of the inner radial lines; and an inboard corner or edge of a second one of the inclined second magnet may be disposed on a second one of the inner radial lines.

Alternatively, or in addition, the inner second central angle may be defined by the equation:

$$\frac{60}{p} < A3I$$

where A3I is the inner second central angle; and p is the number of pole pairs in the rotor.

Alternatively, or in addition, the inner second central angle may be defined by the equation:

$$\frac{70}{p} < A3I$$

where A3I is the inner second central angle; and p is the number of pole pairs in the rotor.

The rotor may comprise four (4) pole pairs (p=4) and the inner second central angle may be in the range 15° to 22°, inclusive. The inner second central angle may be 18.5°±3.5°.

The rotor may have six (6) rotor poles, i.e. having three (3) rotor pairs (p=3). The inner second central angle A3I may be in the range 20° to 30° inclusive. The inner second central angle A3I may be in the range 20° to 29.3° inclusive. The inner second central angle A3I may be 24.7°±4.7°. The inner second central angle A3I may be in the range 23.3° to 26.6°, inclusive. The inner second central angle A3I may be 24°±2°, or 24°±1°. The inner second central angle A3I may be approximately 24°.

The inner second central angle may be less than or equal to the first central angle.

Each inclined second magnet may comprise an outer end (disposed distal from the central pole axis). Two outer radial lines may be defined extending from the longitudinal axis of the rotor and coincident with the outer ends of the inclined second magnets. An outer second central angle may be between the two outer radial lines. The outer second central angle may be defined by the equation:

$$A3O < \frac{170}{p}$$

where A3O is the outer second central angle; and p is the number of pole pairs in the rotor.

The outer second central angle may be defined by the equation:

$$A3O < \frac{168}{p}$$

where A3O is the outer second central angle; and p is the number of pole pairs in the rotor.

Alternatively, or in addition, the outer second central angle may be defined by the equation:

$$\frac{150}{p} < A3O$$

where A3O is the outer second central angle; and p is the number of pole pairs in the rotor.

Alternatively, or in addition, the outer second central angle may be defined by the equation:

$$\frac{160}{p} < A3O$$

where A3O is the outer second central angle; and p is the number of pole pairs in the rotor.

The rotor may comprise four (4) pole pairs (p=4) and the outer second central angle A3O may be the range 40° to 42°, inclusive. The outer second central angle A3O may be 41°±1°. The outer second central angle A3O may be approximately 40°.

The rotor may have six (6) rotor poles, i.e. three (3) rotor pairs (p=3). The outer second central angle may be in the range 50° to 56.7°, inclusive. The outer second central angle may be in the range 53.3° to 56°, inclusive. The outer second central angle may be 54.7°±1.3°. The outer second central angle may be approximately 54°.

The second inclined magnets have transverse axes. The transverse axes of the second inclined angles may be oriented at an included angle relative to each other.

The included angle may be defined by the equation:

$$\frac{270}{p} < V3 < \frac{450}{p}$$

where V3 is the included angle; and p is the number of pole pairs in the rotor.

The included angle may be defined by the equation:

$$\frac{300}{p} < V3 < \frac{340}{p}$$

where V3 is the included angle; and p is the number of pole pairs in the rotor.

The included angle may be defined by the equation:

$$\frac{332}{p} < V3 < \frac{338}{p}$$

where V3 is the included angle; and p is the number of pole pairs in the rotor.

The included angle of the inclined second magnets for a rotor having eight (8) poles may be defined as 67.5°<V3<112.5°. The included angle of the inclined second magnets for a rotor having eight (8) poles may be defined as 75°<V3<85°. The included angle of the inclined second magnets for a rotor having eight (8) poles may be in the range 67.5° to 112.5° inclusive. The included angle of the inclined second magnets may be 80°±5°. The included angle of the inclined second magnets may be 84°±4°; or may be 84°±2°; or may be 84°±1°. The included angle of the inclined second magnets may be approximately 84°.

The included angle of the inclined second magnets for a rotor having six (6) poles may be defined as 100°<V3<113.3°. The included angle of the inclined second magnets for a rotor six (6) rotor poles may be in the range 90° to 150° inclusive. The included angle may be in the range 100° to 120° inclusive. The included angle may be 106.7°±6.7° inclusive. The included angle may be approximately 104°.

Each rotor pole may comprise a third magnet layer. The third magnet layer may be disposed between the first and second magnet layers. The third magnet layer may comprise two or more third magnets. The third magnet layer may comprise a pair of inclined third magnets each having a first transverse axis extending at an acute angle to the central pole axis.

At least in certain embodiments, each rotor may be configured such that, in relation to the central pole axis, a portion of each of the inclined third magnets is disposed inboard of an end of the one or more central first magnet to form an overlapping arrangement. A corner of each of the inclined third magnets may be aligned with or disposed inboard of an end of one of the inclined second magnets to form an overlapping arrangement.

Alternatively, or in addition, the topology of the second magnets disposed in the second layer described herein may be applied to the third magnets disposed in the third layer. In certain embodiments, the second magnets and the third magnets may have substantially the same topology. For example, the inclined second magnets and the inclined third magnets may be arranged substantially parallel to each other.

The third inclined magnets have transverse axes. The transverse axes of the third inclined magnets may be oriented at an included angle (V2) relative to each other. The included angle (V2) may be defined by the equation:

$$\frac{270}{p} < V2 < \frac{450}{p}$$

where V2 is the included angle; and p is the number of pole pairs in the rotor core.

According to an aspect of the present invention there is provided a rotor assembly for an electric machine, the rotor assembly comprising a rotor and a plurality of magnets, the magnets being configured to form a plurality of rotor poles and each rotor pole having a central pole axis extending in a radial direction from a longitudinal axis of the rotor; wherein each rotor pole comprises: a first magnet layer comprising one or more first magnet, the one or more first magnet comprising a central first magnet having a first transverse axis disposed substantially perpendicular to the central pole axis; a second magnet layer radially inset from the first magnet layer and comprising two or more second magnets, the second magnets comprising a pair of inclined second magnets each having an inner end, an outer end and a first transverse axis extending at an acute angle to the central pole axis; wherein two inner radial lines extending from the longitudinal axis of the rotor are coincident with the inner ends of the inclined second magnets; and an inner second central angle is formed between the two inner radial lines, the inner second central angle being defined by the equation:

$$\frac{60}{p} < A3I < \frac{88}{p}$$

where A3I is the inner second central angle; and p is the number of pole pairs in the rotor; and wherein two outer radial lines extending from the longitudinal axis of the rotor are coincident with the outer ends of the inclined second magnets; and an outer second central angle is formed between the two outer radial lines, the outer second central angle being defined by the equation:

$$\frac{150}{p} < A3O < \frac{170}{p}$$

where A3O is the outer second central angle; and p is the number of pole pairs in the rotor.

The second inclined magnets have transverse axes. The transverse axes of the second inclined angles may be oriented at an included angle relative to each other.

The included angle may be defined by the equation:

$$\frac{270}{p} < V3 < \frac{450}{p}$$

where V3 is the included angle; and p is the number of pole pairs in the rotor.

The included angle may be defined by the equation:

$$\frac{300}{p} < V3 < \frac{340}{p}$$

where V3 is the included angle; and p is the number of pole pairs in the rotor.

According to a further aspect of the present invention there is provided an electric machine comprising a rotor assembly as described herein.

According to a further aspect of the present invention there is provided an electric machine comprising: a stator assembly comprising a plurality of stator teeth; and a rotor assembly having a rotor and a plurality of magnets, the magnets being configured to form a plurality of rotor poles. The rotor poles each comprise a first magnet layer comprising a central first magnet. The rotor poles each have a central pole axis. The central first magnet has a first transverse dimension in a direction perpendicular to the central pole axis.

The first dimension may be greater than or substantially equal to a transverse dimension of two (2) adjacent stator teeth in the stator assembly. The first dimension may be greater than or substantially equal to a transverse dimension of three (3) adjacent stator teeth in the stator assembly. The transverse dimension of the stator teeth may be measured perpendicular to a radius of the stator core. For example, the transverse dimension may be measured in a direction perpendicular to a radial centreline of a middle one of the three (3) adjacent stator teeth.

Alternatively, or in addition, a first central angle measured between two first radial lines coincident with the opposing ends of the central first magnet may be greater than or equal an included angle between first and third radial centrelines of the first and third stator teeth respectively in each set of three (s) adjacent teeth.

According to a further aspect of the present invention there is provided a vehicle comprising an electric machine as described herein. The electric machine may be a traction motor for propelling the vehicle. The vehicle may be a road vehicle, such as an automobile.

The disclosure herein references various axes and lines, including radial lines, centrelines, and pole axis (direct and quadrature). Unless indicated to the contrary (explicitly or implicitly), or otherwise required to implement the invention(s) described herein, these are to be understood as being virtual or imaginary features defined to aid understanding of the present invention(s).

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

Figure 1:
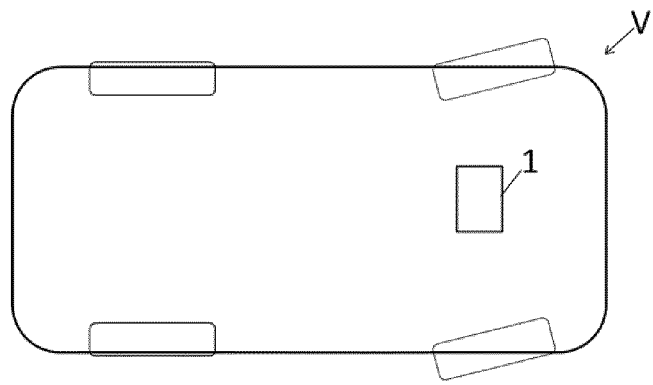
FIG. 1 shows a vehicle incorporating an electric machine in accordance with an embodiment of the present invention.

An electrical machine 1 in accordance with an embodiment of the present invention is described herein with reference to the accompanying Figures. As illustrated in FIG. 1, the electrical machine 1 has particular application as an electric drive unit (EDU) in a vehicle V, such as an automobile, a utility vehicle or a tractor unit. In use, the EDU generates a force to propel the vehicle V. The EDU may be used independently, for example in a battery electric vehicle (BEV) application; or in conjunction with an internal combustion engine (not shown), for example in a hybrid electric vehicle (HEV) application or a plug-in hybrid electric vehicle (PHEV) application. It will be understood that the electrical machine 1 may be used in other applications.

Figure 2:
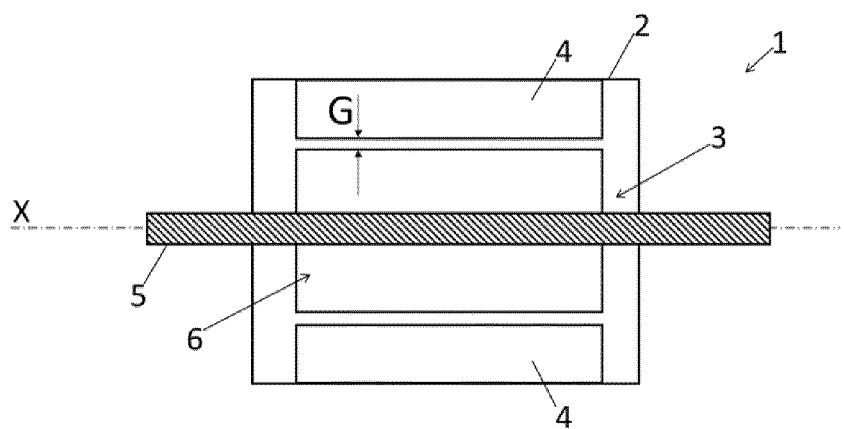
FIG. 2 shows a longitudinal sectional view of the electric machine shown in FIG. 1.
Figure 3:
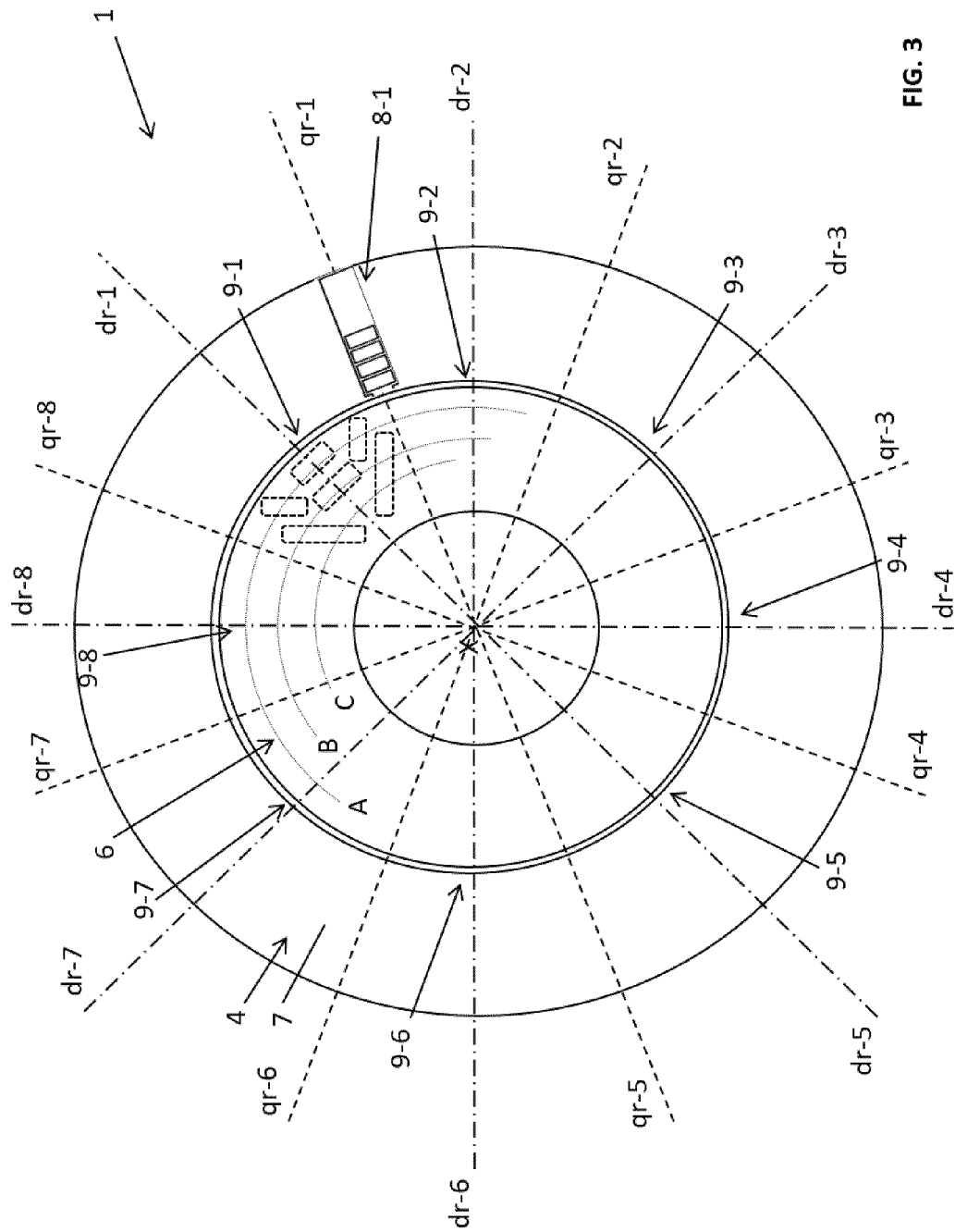
FIG. 3 shows a transverse sectional view of the rotor and stator of the electric machine shown in FIG. 1.

As shown in FIG. 2, the electrical machine 1 comprises a housing 2, a rotor assembly 3, a stator assembly 4 and a drive shaft 5. The electrical machine 1 is described herein with reference to a longitudinal axis X about which the drive shaft 5 rotates. The rotor assembly 3 comprises a rotor (core) 6 which is mounted to the drive shaft 5 (shown in FIG. 3). The stator assembly 4 comprises a stator core 7 composed of a plurality of laminations of a ferromagnetic material. The rotor core 6 is fixedly mounted to the drive shaft 5 such that the rotor core 6 and the drive shaft 5 rotate together. The rotor core 6 is made up of a plurality of laminations of a ferromagnetic material to form a rotor iron. The rotor core 6 may be approximated as a right cylinder co-axial with the longitudinal axis X and having an effective rotor radius r0. The rotor core 6 has an outer surface 8 which is spaced apart from the stator core 7 to form an air gap G. As shown in FIG. 3, the stator 4 comprises a cylindrical stator core 7. The stator core 7 is composed of a plurality of laminations of a ferromagnetic material. The stator core 7 comprises a plurality of teeth 8-$n$ projecting radially inwardly.

The electrical machine 1 in the present embodiment is a permanent magnet synchronous motor. As shown in FIG. 3, the rotor core 6 comprises a plurality of rotor poles 9-$n$ (the suffix n identifying a pole number). The rotor core 6 in the present embodiment comprises eight (8) rotor poles 9-$n$. The rotor poles 9-$n$ each have a direct axis dr-n and a quadrature axis qr-n. The direct axis dr-n extends radially and corresponds to a central pole axis of each rotor pole 9-$n$. The rotor poles 9-$n$ have an equal angular spacing (i.e. a pitch) between the direct axes dr-n of adjacent rotor poles 9-$n$. The angular pitch of the rotor poles 9-$n$ in the present embodiment is 45° (360°/8).

The rotor poles 9-$n$ each comprise a plurality of permanent magnets (denoted generally by the reference numeral 10) mounted in magnet receiving apertures 11 formed in the rotor core 6. At least one magnet engaging projection 12 is associated with each magnet receiving aperture 11 to inhibit or reduce movement of the permanent magnet 10 relative to the rotor core 6. For example, first and second projections 12 may be formed in the rotor core 6 to engage opposing ends of each permanent magnet 10. At least one flux barrier 13 is associated with each magnet receiving aperture 11 to control magnetic flux in the rotor core 6. The or each flux barrier 13 has a lower magnetic permeability than the rotor core 6. The or each flux barrier 13 may, for example, comprise an aperture formed in the rotor core 6. In the present embodiment, the flux barriers 13 are formed as extensions of the magnet receiving apertures 11.

The permanent magnets 10 extend lengthwise through the rotor core 6. Each permanent magnet 10 is described herein with reference to a local coordinate frame comprising a longitudinal axis X1, a transverse axis Y1 and a vertical axis Z1 (defined herein with reference to a centre of the permanent magnets 10). The longitudinal axis X1 of each permanent magnet 10 extends parallel to the longitudinal axis X of the rotor core 6 (i.e. out of the page in the arrangement shown in FIG. 3). The permanent magnets 10 are substantially rectangular in transverse cross-section and have a uniform profile along the transverse axis Y1. Unless indicated to the contrary, the description herein of the position and orientation of the permanent magnets 10 is within the transverse cross-section of the rotor core 6 (i.e. in a plane perpendicular to the longitudinal axis X). The orientation of the permanent magnets 10 is described herein with reference to the orientation of the transverse axis Y1 and the vertical axis Z1. The permanent magnets 10 described herein are each illustrated as having a unitary composition. It will be understood that each permanent magnet 10 may be formed from a plurality of magnets. The permanent magnets 10 may comprise a plurality of segments disposed alongside each other. One or more of the permanent magnets 10 may comprise a segmented magnet.

The permanent magnets 10 are arranged in the rotor core 6 in a plurality of layers (referred to herein as the magnet layers). The magnet layers are radially offset from each other in order to form channels between the permanent magnets 10 for guiding the magnetic flux in the rotor core 6. One or more of the permanent magnets 10 is disposed in each magnet layer. In the present embodiment, the permanent magnets 10 are arranged in three (3) magnet layers which are spaced apart from each other in a radial direction. In particular, the core 6 comprises a first magnet layer A disposed in an outer radial position; a second magnet layer B disposed in an intermediate radial position; and a third magnet layer C disposed in an inner radial position. The or each permanent magnet 10 disposed in the first magnet layer A is referred to herein as a first magnet 10A-n; the or each permanent magnet 10 disposed in the second magnet layer B is referred to herein as a second magnet 10B-n; and the or each permanent magnet 10 disposed in the third magnet layer C is referred to herein as a third magnet 10C-n. (The suffix "n" is used herein to denote particular magnets 10 in each of the first, second and third layers A, B, C.)

The configuration of the permanent magnets 10 is the same in each of the rotor poles 9-$n$. For the sake of brevity, a first one of the rotor poles 9-1 will now be described with reference to FIG. 4. It will be understood that the other rotor poles 9-$n$ in the rotor assembly 3 have substantially the same configuration.

The first magnet layer A in the first rotor pole 9-1 comprises a plurality of first magnets 10A-n. The first magnet layer A comprises a central first magnet 10A-1 and a pair of inclined first magnets 10A-2, 10A-3. The central first magnet 10A-1 is disposed in a central region of the first rotor pole 9-1 and extends in a transverse direction (relative to the direct axis dr-n). The central first magnet 10A-1 is substantially rectangular in profile and has a first dimension DA(Y) along the transverse axis Y1; and a second dimension DA(Z) along the vertical axis Z1. The central first magnet 10A-1 has opposing first and second ends 10A-1L, 10A-1R. The transverse axis Y1 of the central first magnet 10A-1 extends substantially perpendicular to the direct axis dr-n. In a variant, two or more central first magnets 10A-1 may be provided in the central region of the first rotor pole 9-1. The transverse axis Y1 of the two or more central first magnets 10A-1 could be inclined relative to the direct axis dr-1, for example to form a V-shaped arrangement.

The inclined first magnets 10A-2, 10A-3 are disposed on first and second sides respectively of the central first magnet 10A-1 in a V-shaped arrangement. Each of the inclined first magnets 10A-2, 10A-3 is inclined at an acute angle relative to the direct axis dr-n. In particular, the transverse axis Y1 of each of the inclined first magnets 10A-2, 10A-3 extends at a first acute angle $\alpha 1$ relative to the direct axis dr-n. The inclined first magnets 10A-2, 10A-3 are symmetrical about the direct axis dr-n.

The second magnet layer B in the first rotor pole 9-1 comprises a plurality of second magnets 10B-n. The second magnet layer B comprises a central second magnet 10B-1 and a pair of inclined second magnets 10B-2, 10B-3. The central second magnet 10B-1 is disposed in a central region of the first rotor pole 9-1 and extends in a transverse direction (relative to the direct axis dr-n). The central second magnet 10B-1 is substantially rectangular in profile and has a first dimension DB(Y) along the transverse axis Y1; and a second dimension DB(Z) along the vertical axis Z1. The central second magnet 10B-1 has opposing first and second ends 10B-1L, 10B-1R. The transverse axis Y1 of the central second magnet extends substantially perpendicular to the direct axis dr-n. In a variant, two or more central second magnets 10B-1 may be provided in the central region of the second rotor pole 9-1. The transverse axis Y1 of the two or more central second magnets 10B-1 could be inclined relative to the direct axis dr-n, for example to form a V-shaped arrangement.

The inclined second magnets 10B-2, 10B-3 are disposed on first and second sides respectively of the central second magnet 10B-1 in a V-shaped arrangement. The inclined second magnets 10B-2, 10B-3 are mounted at an acute angle relative to the direct axis dr-n. In particular, the transverse axis Y1 of each of the inclined second magnets 10B-2, 10B-3 extends at a second acute angle α2 relative to the direct axis dr-n. The inclined second magnets 10B-2, 10B-3 each have inner and outer ends 10B-2L, 10B-2R; 10B-3L, 10B-3R (with reference to the direct axis dr-n). The inclined second magnets 10B-2, 10B-3 are symmetrical about the direct axis dr-n. The inclined second magnets 10B-2, 10B-3 have inner ends 10B-2I, 10B-3I disposed proximal to the direct axis dr-n; and outer ends 10B-2O, 10B-3O disposed proximal to the quadrature axis qr-n. The inner ends 10B-2I, 10B-3I of the inclined second magnets 10B-2, 10B-3 are spaced apart from each other by a second distance W2 (measured perpendicular to the direct axis dr-n).

The third magnet layer B in the first rotor pole 9-1 comprises a central third magnet 10C-1 and a pair of inclined third magnets 10C-2, 10C-3. The central third magnet 10C-1 is disposed in a central region of the first rotor pole 9-1 and extends in a transverse direction (relative to the direct axis dr-n). The central third magnet 10C-1 is substantially rectangular in profile and has a first dimension DC(Y) along the transverse axis Y1; and a second dimension DC(Z) along the vertical axis Z1. The central third magnet 10C-1 has opposing first and third ends 10C-1L, 10C-1R. In a variant, two or more central third magnets 10C-1 may be provided in the central region of the third rotor pole 9-1. The transverse axis Y1 of the central third magnet 10C-1 extends substantially perpendicular to the direct axis dr-n. In a variant, two or more central third magnets 10C-1 may be provided in the central region of the third rotor pole 9-1. The transverse axis Y1 of the two or more central third magnets 10C-1 could be inclined relative to the direct axis dr-n, for example to form a V-shaped arrangement.

The inclined third magnets 10C-2, 10C-3 are disposed on first and second sides respectively of the central third magnet 10C-1 in a V-shaped arrangement. The inclined third magnets 10C-2, 10C-3 are mounted at an acute angle relative to the direct axis dr-n. In particular, the transverse axis Y1 of each of the inclined third magnets 10C-2, 10C-3 extends at a third acute angle α3 relative to the direct axis dr-n. The inclined third magnets 10C-2, 10C-3 each have inner and outer ends 10C-2I, 10C-2O; 10C-3I, 10C-3O (with reference to the direct axis dr-n). The inclined third magnets 10C-2, 10C-3 are symmetrical about the direct axis dr-n. The inclined third magnets 10C-2, 10C-3 have inner ends 10C-2I, 10C-3I disposed proximal to the direct axis dr-n; and outer ends 10C-2O, 10C-3O disposed proximal to the quadrature axis qr-n. The inner ends 10C-2I, 10C-3I of the inclined third magnets 10C-2, 10C-3 are spaced apart from each other by a third distance W3 (measured perpendicular to the direct axis dr-n).

Figure 4:
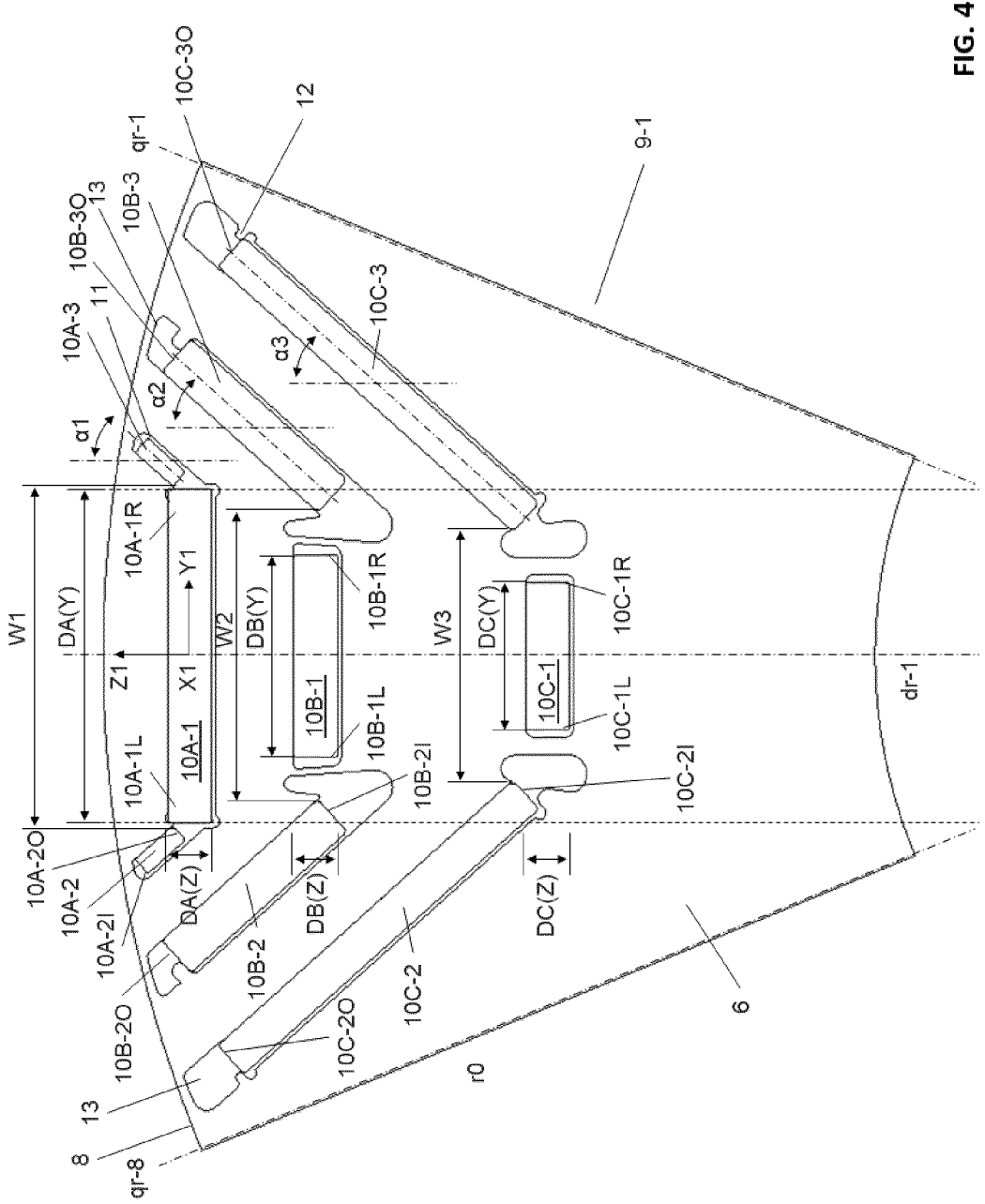
FIG. 4 shows a transverse sectional view of a first rotor pole according to an embodiment of the present invention.

In the present embodiment, each of the central first, second and third magnets 10A-1, 10B-1, 10C-1 is disposed on the direct axis dr-n of the first rotor pole 9-1. Moreover, the vertical axis Z1 of each of the central first, second and third magnets 10A-1, 10B-1, 10C-1 is disposed along the direct axis dr-n. As shown in FIG. 4, the first dimension DA(Y) of the central first magnet 10A-1 is greater than or equal to the corresponding first dimension DB(Y) of the central second magnet 10B-1 (DA(Y)≥DA(Z)). The first dimension DB(Y) of the central second magnet 10B-1 is greater than the corresponding first dimension DC(Y) of the central third magnet 10C-1 (DB(Y)>DC(Y)). In the present embodiment, the inclined second magnets 10B-2, 10B-3 form an overlap with the flux barrier formed between the central first magnet 10A-1 and the inclined first magnets 10A-2, 10-3 respectively.

The inclined second and third magnets 10B-2, 10B-3, 10C-2, 10C-3 are arranged in an overlapping arrangement with the central first magnet 10A-1. In particular, the central first magnet 10A-1 extends outwardly from the direct axis dr-n beyond the inner ends 10B-2I, of the inclined second magnets 10B-2, 10B-3; and beyond the inner ends 10C-2I, 10C-3I of the inclined third magnets 10C-2, 10C-3. The second distance W2 between the inner ends 10B-3I of the inclined second magnets 10B-2, 10B-3 is less than the first dimension DA(Y) along the transverse axis of the central first magnet 10A-1. The third distance W3 between the inner ends 10C-2I, 10C-3I of the inclined third magnets 10C-2, 10C-3 (measured perpendicular to the direct axis dr-n) is less than the first dimension DA(Y) along the transverse axis of the central first magnet 10A-1. This overlapping arrangement is effective in controlling the magnetic flux in the air gap between the rotor assembly 3 and the stator assembly 4. This arrangement may, for example, reduce interruptions or discontinuities in the magnetic flux present in the air gap. The resulting magnetic flux established in the air gap may change progressively across the first rotor pole 9-n. The topology of the permanent magnets 10 in each rotor pole 9-n generates a magnetic flux in the air gap having a magnitude which is generally sinusoidal in form. The magnitude of the magnetic flux is greatest at or proximal to the direct axis dr-n of the rotor pole 9-n; and smallest at or proximal to the quadrature axis qr-1 of the rotor pole 9-n. The magnitude of the magnetic flux in the air gap may be substantially zero at the quadrature axis qr-n. This sinusoidal variation in the magnitude of the magnetic flux is repeated for each of the rotor poles 9-n. At least in certain embodiments, this may improve operating characteristics of the electric machine 1.

The central first magnet 10A-1 and the central second magnet 10B-1 contribute to the magnetic flux on the direct axis dr-n. The inclined second magnets 10B-2, 10B-3 contribute to the magnetic flux on the direct axis dr-n and also the magnetic flux in the channel formed in the rotor core 6 formed between the first and second magnet layers A, B. The amount of overlap between the inclined second magnets 10B-2, 10B-3 and the central first magnet 10A-1 determines the distribution of the magnetic flux. The inclined third magnets 10C-2, 10C-3 contribute to the magnetic flux on the direct axis dr-n and also the magnetic flux in the channel formed in the rotor core 6 formed between the second and third magnet layers B, C. The relative length of the first dimension DB(Y) of the central second magnet 10B-1 and the third distance W3 between the inner ends 10C-2I, 10C-3I of the inclined third magnets 10C-2, 10C-3 determines the distribution of the magnetic flux. The rotor assembly 3 in the present embodiment is configured such that the magnetic flux in the air gap is largest at or proximal to the direct axis dr-n under normal operating conditions. Conversely, the magnetic flux in the air gap is smallest at or proximal to the quadrature axis qr-n.

The inclined first, second and third magnets 10A-2, 10A-3, 10B-2, 10B-3, 10C-2, 10C-3 are positioned within the rotor core 6 to control the magnetic flux in the air gap G. In the present embodiment, the transverse axis Y1 of the inclined second and third magnets 10B—2, 10B-3, 10C-2, 10C-3 extend substantially parallel to each other. As outlined above, the inclined first, second and third magnets 10A-2, 10A-3, 10B-2, 10B-3, 10C-2, 10C-3 are symmetrical about the direct axis dr-n.

Figure 5:
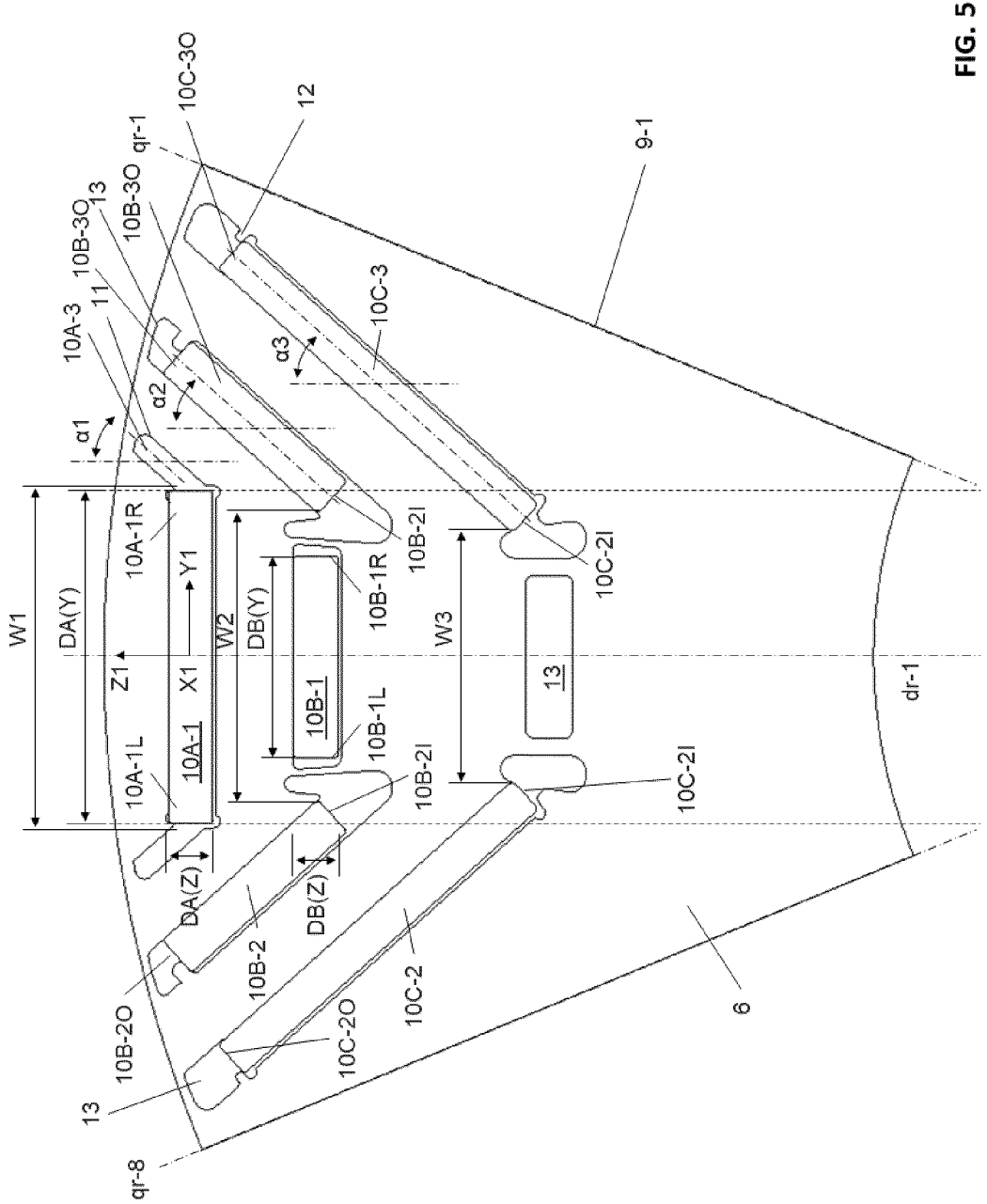
FIG. 5 shows a transverse sectional view of a first rotor pole according to a further embodiment of the present invention having eight rotor poles.

A rotor assembly 3 in accordance with a further embodiment of the present invention will now be described with reference to FIG. 5. Like reference numerals are used for like components. The description of this embodiment of the rotor assembly 3 focuses on the differences over the previous embodiment.

The rotor assembly 3 comprises a rotor core 6 having a plurality of permanent magnets 10 arranged in first, second and third magnet layers A, B, C. The first magnet layer A is disposed in an outer radial position; the second magnet layer B is disposed in an intermediate radial position; and the third magnet layer C is disposed in an inner radial position. The topology of the rotor core 6 is described herein with reference to the number of pole pairs (p). The rotor assembly 3 comprises eight (8) rotor poles 9-$n$ corresponding to four (4) pole pairs (p=4). The rotor core 6 has a rotor radius. The angular pitch of the rotor poles 9-$n$ in the present embodiment is 45° (360°/8). The rotor poles 9-$n$ have like topologies and each comprise a direct axis dr-n and a quadrature axis qr-n. The rotor assembly 3 is described with reference to the first rotor pole 9-1.

The first magnet layer A of the first rotor pole 9-1 consists of a central first magnet 10A-1 disposed in a central region of the first rotor pole 9-1. The inclined first magnets 10A-2, 10A-3 are omitted in this embodiment. The central first magnet 10A-1 extends in a transverse direction relative to the direct axis dr-n. The central first magnet 10A-1 is substantially rectangular in profile and has a first dimension DA(Y) along the transverse axis Y1; and a second dimension DA(Z) along the vertical axis Z1. The central first magnet 10A-1 has opposing first and second ends 10A-1L, 10A-1R. The transverse axis Y1 of the central first magnet 10A-1 extends substantially perpendicular to the direct axis dr-n. In a variant, two or more central first magnets 10A-1 may be provided in the central region of the first rotor pole 9-1. The transverse axis Y1 of the two or more central first magnets 10A-1 could be inclined relative to the direct axis dr-n, for example to form a V-shaped arrangement.

The second magnet layer B of the first rotor pole 9-1 comprises a plurality of second magnets 10B-$n$. The second magnet layer B comprises a pair of inclined second magnets 10B-2, 10B-3. The central second magnet 10B-1 is disposed in a central region of the first rotor pole 9-1 and extends in a transverse direction (relative to the direct axis dr-n). The central second magnet 10B-1 is substantially rectangular in profile and has a first dimension DB(Y) along the transverse axis Y1; and a second dimension DB(Z) along the vertical axis Z1. The central second magnet 10B-1 has opposing first and second ends 10B-1L, 10B-1R. The transverse axis Y1 of the central second magnet 10B-1 extends substantially perpendicular to the direct axis dr-n. In a variant, two or more central second magnets 10B-1 may be provided in the central region of the second rotor pole 9-1.

The inclined second magnets 10B-2, 10B-3 are disposed on first and second sides respectively of the central second magnet 10B-1 in a V-shaped arrangement. The inclined second magnets 10B-2, 10B-3 are mounted at an acute angle relative to the direct axis dr-n. In particular, the transverse axis Y1 of each of the inclined second magnets 10B-2, 10B-3 extends at a second acute angle α2 relative to the direct axis dr-n. The inclined second magnets 10B-2, 10B-3 each have inner and outer ends 10B-2L, 10B-2R; 10B-3L, 10B-3R (with reference to the direct axis dr-n). The inclined second magnets 10B-2, 10B-3 are symmetrical about the direct axis dr-n. The inclined second magnets 10B-2, 10B-3 have inner ends 10B-2I, 10B-3I disposed proximal to the direct axis dr-n; and outer ends 10B-2O, 10B-3O disposed proximal to the quadrature axis qr-n. The inner ends 10B-2I, 10B-3I of the inclined second magnets 10B-2, 10B-3 are spaced apart from each other by a second distance W2 (measured perpendicular to the direct axis dr-n).

The third magnet layer C of the first rotor pole 9-1 comprises a plurality of third magnets 10C-$n$. The third magnet layer C comprises a pair of inclined third magnets 10C-2, 10C-3. The central third magnet 10C-1 is omitted in this embodiment. An aperture is formed in the rotor core 6 in place of the central second magnet 10B-1. The aperture extends in a longitudinal direction parallel to the longitudinal axis X of the rotor core 6. The longitudinal aperture may facilitate cooling of an interior of the rotor core 6, for example by directing a cooling fluid, such as air, through the rotor core 6. In a variant, the central third magnet 10C-1 may be included in the third magnet layer C. The rotor core 6 comprises a flux barrier 13 in a central region corresponding generally to the location of the central third magnet 10C-1.

The inclined third magnets 10C-2, 10C-3 are disposed on opposing sides of the direct axis dr-n. The inclined third magnets 10C-2, 10C-3 are mounted at an acute angle relative to the direct axis dr-n. In particular, the transverse axis Y1 of each of the inclined third magnets 10C-2, 10C-3 extends at a third acute angle α3 relative to the direct axis dr-n. The inclined third magnets 10C-2, 10C-3 each have inner and outer ends 10C-2I, 10C-2O; 10C-3I, 10C-3O (with reference to the direct axis dr-n). The inclined third magnets 10C-2, 10C-3 are symmetrical about the direct axis dr-n. The inclined third magnets 10C-2, 10C-3 have inner ends 10C-2I, 10C-3I disposed proximal to the direct axis dr-n; and outer ends 10C-2O, 10C-3O disposed proximal to the quadrature axis qr-n. The inner ends 10C-2I, 10C-3I of the inclined third magnets 10C-2, 10C-3 are spaced apart from each other by a third distance W3 (measured perpendicular to the direct axis dr-n).

The central first and second magnets 10A-1, 10B-1 are disposed on the direct axis dr-n of the first rotor pole 9-1. Moreover, the vertical axis Z1 of each of the central first and second magnets 10A-1, 10B-1 are disposed along the direct axis dr-n. As shown in FIG. 5, the first dimension DA(Y) of the central first magnet 10A-1 is greater than the corresponding first dimension DB(Y) of the central second magnet 10B-1 (DA(Y)>DB(Y)).

The inclined second and third magnets 10B-2, 10B-3, 10C-2, 10C-3 are arranged in an overlapping arrangement with the central first magnet 10A-1. In particular, the central first magnet 10A-1 extends outwardly from the direct axis dr-n beyond the inner ends 10B-2I, 20B-3I of the inclined second magnets 10B-2, 10B-3; and beyond the inner ends 10C-2I, 10C-3I of the inclined third magnets 10C-2, 10C-3. The second distance W2 between the inner ends 10B-3I of the inclined second magnets 10B-2, 10B-3 is less than the first dimension DA(Y) along the transverse axis Y1 of the central first magnet 10A-1. The third distance W3 between the inner ends 10C-2I, 10C-3I of the inclined third magnets 10C-2, 10C-3 is less than the first dimension DA(Y) along the transverse axis of the central first magnet 10A-1. This overlapping arrangement is effective in controlling the magnetic flux in the air gap between the rotor assembly 3 and the stator assembly 4. This arrangement may, for example, reduce interruptions or discontinuities in the magnetic flux present in the air gap. The resulting magnetic flux established in the air gap may change progressively across the first rotor pole 9-$n$. The topology of the permanent magnets 10 in each rotor pole 9-n generates a magnetic flux in the air gap having a magnitude which is generally sinusoidal in form. The magnitude of the magnetic flux is greatest at or proximal to the direct axis dr-n of the rotor pole 9-n; and smallest at or proximal to the quadrature axis qr-1 of the rotor pole 9-n. The magnitude of the magnetic flux in the air gap may be substantially zero at the quadrature axis qr-n. This sinusoidal variation in the magnitude of the magnetic flux is repeated for each of the rotor poles 9-n. At least in certain embodiments, this may improve operating characteristics of the electric machine 1.

The central first magnet 10A-1 and the central second magnet 10B-1 contribute to the magnetic flux on the direct axis dr-n. The inclined second magnets 10B-2, 10B-3 contribute to the magnetic flux on the direct axis dr-n and also to the magnetic flux in the channel formed in the rotor core 6 formed between the first and second magnet layers A, B. The amount of overlap between the inclined second magnets 10B-2, 10B-3 and the central first magnet 10A-1 determines the distribution of the magnetic flux. The inclined third magnets 10C-2, 10C-3 contribute to the magnetic flux on the direct axis dr-n and also to the magnetic flux in the channel formed in the rotor core 6 formed between the second and third magnet layers B, C.

The central first magnet 10A-1 is disposed on the direct axis dr-n of the first rotor pole 9-1. The vertical axis Z1 of the central first magnet 10A-1 is disposed along the direct axis dr-n. The transverse first dimension DA(Y) of the central first magnet 10A-1 along the transverse axis Y1 is greater than the second separation distance W2 between the inner ends 10B-3I of the inclined second magnets 10B-2, 10B-3; and also greater than the third separation distance W3 between the inner ends 10C-2I, 10C-3I of the inclined third magnets 10C-2, 10C-3. The second separation distance W2 is greater than the third separation distance W3 (W2>W3).

Figure 6:
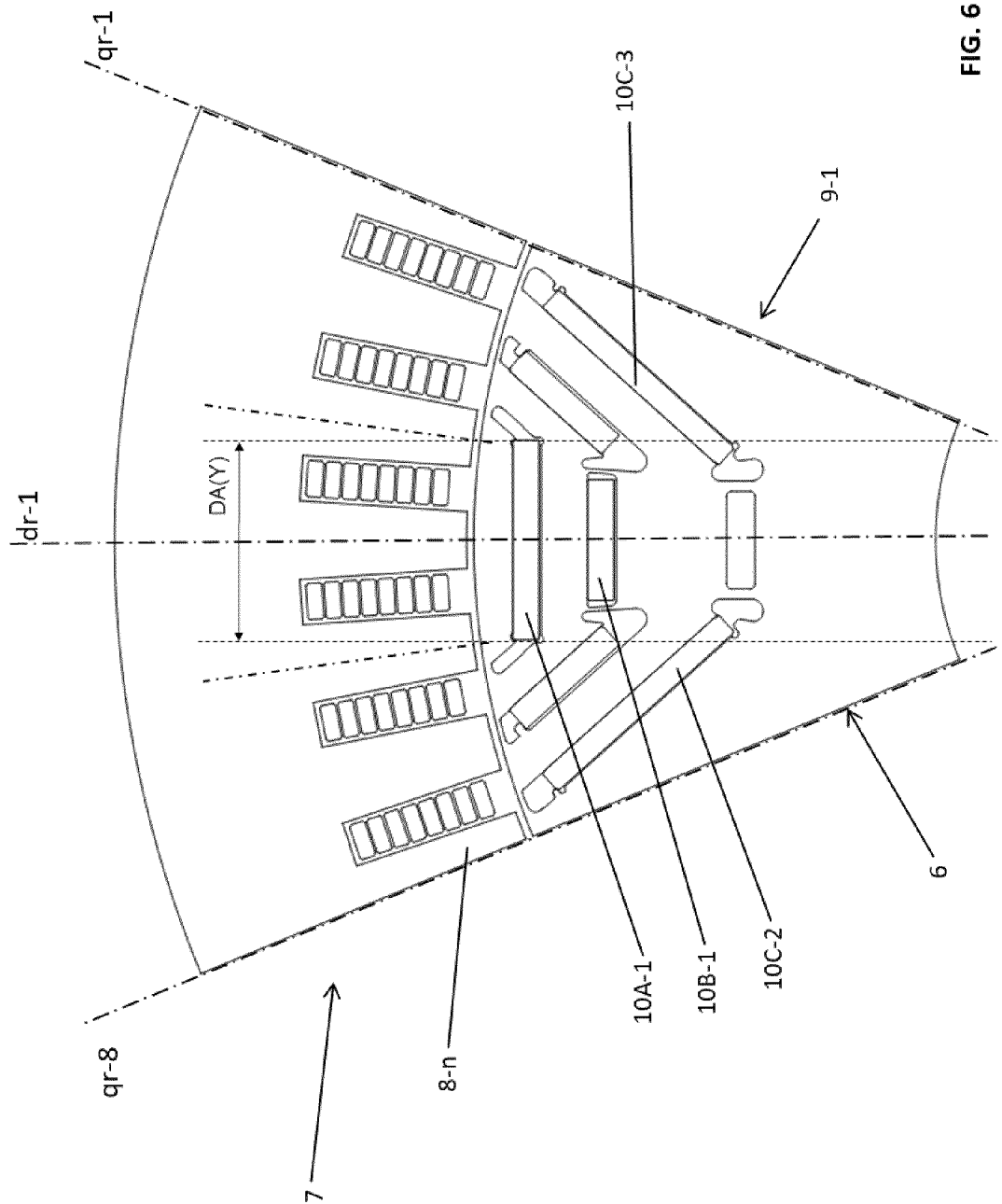
FIG. 6 shows the relationship between the stator teeth and the magnet topology in the first rotor pole shown in FIG. 5.
Figure 7:
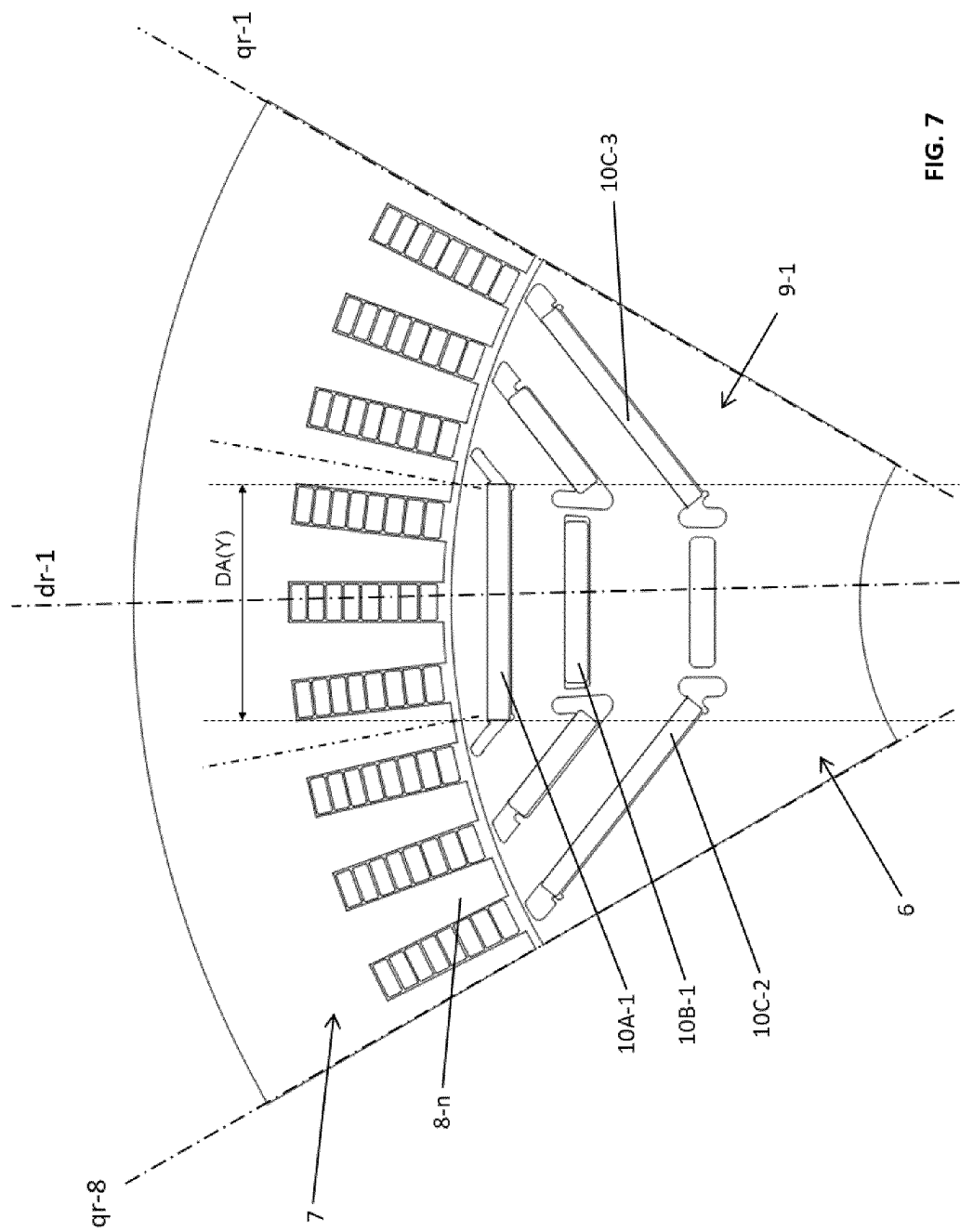
FIG. 7 shows the relationship between the stator teeth and the magnet topology in a rotor core having six rotor poles.

The central first magnet 10A-1 is configured to span at least two (2) of the stator teeth 8-n in the stator core 7. As shown in FIG. 6, the first dimension DA(Y) is defined such that the central first magnet 10A-1 extends across at least two (2) of the stator teeth 8-n. The first dimension DA(Y) is greater than or substantially equal to a corresponding transverse dimension of two (2) of the stator teeth 8-n (measured perpendicular to a radius of the stator core 7). At least in certain embodiments, the resulting flux distribution provides improved operational characteristics of the electric machine 1. The rotor core 6 illustrated in FIG. 6 has eight (8) poles and the stator core 7 has forty-eight (48) stator teeth 8-n. The first dimension DA(Y) may be greater than or substantially equal to a corresponding transverse dimension of three (3) of the stator teeth 8-n (measured perpendicular to a radius of the stator core 7). A variant is shown in FIG. 7 in which the rotor core has six (6) poles and the stator core 7 has forty-two (42) stator teeth 8-n. The first dimension DA(Y) is greater than or substantially equal to a corresponding transverse dimension of three (3) of the stator teeth 8-n (measured perpendicular to a radius of the stator core 7).

Figure 8:
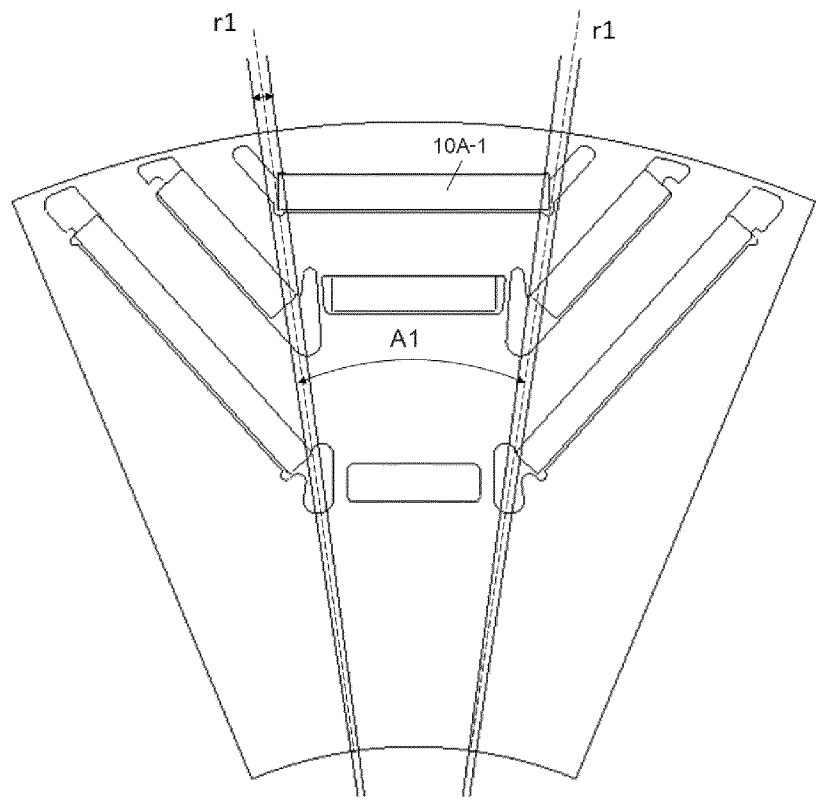
FIG. 8 shows a central angle defined by the central first magnet of the first rotor pole shown in FIG. 5.

The position and extent of the central first magnet 10A-1 is defined with reference to a first central angle A1. The central first magnet 10A-1 forms a first circular sector having a centreline coincident with the direct axis dr-n and a central angle A1. The first central angle A1 is measured between two first radial lines r1 coincident with the opposing ends of the central first magnet 10A-1. As shown in FIG. 8, the first central angle A1 is the included angle between two first radial lines r1 extending from the longitudinal axis X of the rotor core 6 and coincident with the first and second ends 10A-1L, 10A-1R of the central first magnet 10A-1. In the present embodiment, the first radial lines r1 are coincident with the radially inner corners of the central first magnet 10A-1 at the opposing ends thereof. The first central angle A1 is defined by the equation:

$$\frac{1}{4} \cdot \frac{360}{2p} < A1 < \frac{1}{2} \cdot \frac{360}{2p}$$

where p is the number of pole pairs in the rotor core.

The rotor core 5 comprise four (4) pole pairs and the resulting first central angle A1 is in the range 11.25° to 22.5°, inclusive. The upper and lower limits of the first central angle A1 are illustrated in FIG. 8. The first central angle A1 may more precisely be defined by the equation:

$$\frac{60}{p} < A1 < \frac{68}{p}$$

where p is the number of pole pairs in the rotor core.

This refined equation defines the first central angle A1 in the range 15° to 17°, inclusive. The first central angle A1 may be defined as 16°±1°. The first central angle A1 of the first central magnet 10A-1 illustrated in FIG. 8 is approximately 16°.

Figure 9:
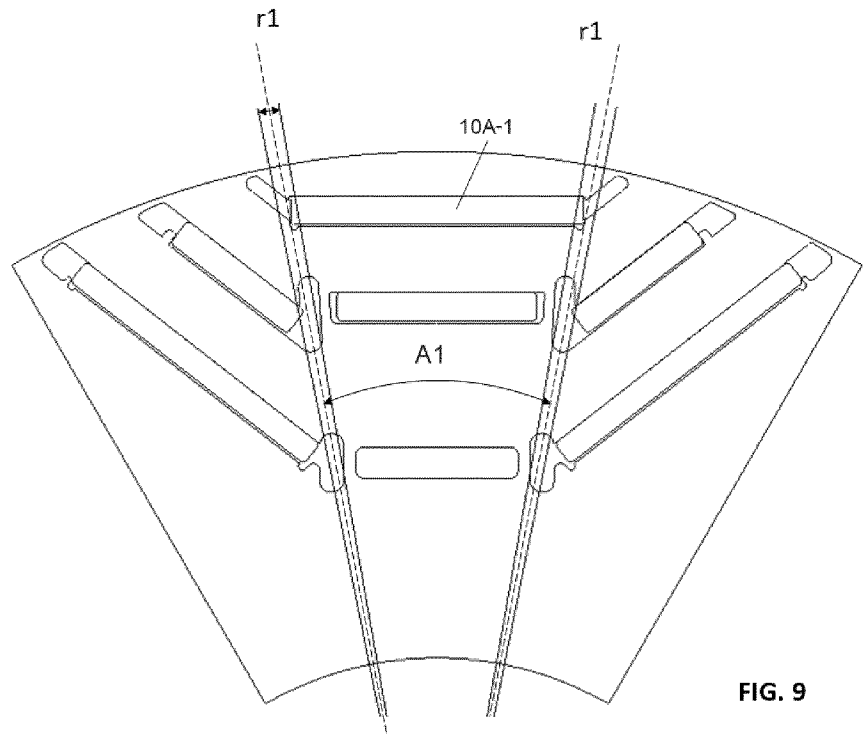
FIG. 9 shows a central angle defined by the central first magnet of the first rotor pole shown in FIG. 7.

As shown in FIG. 9, this approach is applicable also to a rotor core 6 having six (6) rotor poles 9-n, i.e. having three (3) rotor pairs (p=3). The application of the above equation for a rotor having six (6) rotor poles 9-n defines the first central angle A1 in the range 15° to 30°. The refined equation defines the first central angle A1 in the range 20° to 22.7°. The first central angle A1 may be 21.3°±1.3°. The first central angle A1 illustrated in FIG. 9 is approximately 21.3°.

Figure 10:
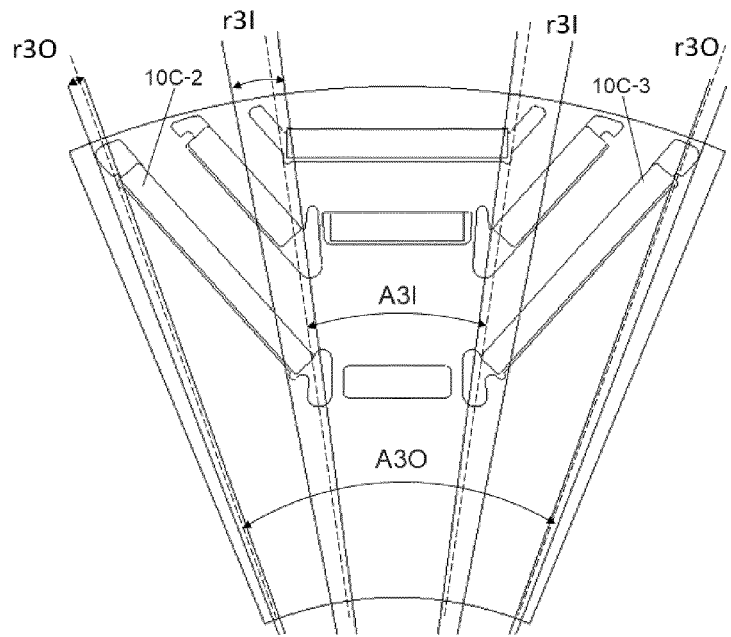
FIG. 10 shows inner and outer central angles defined by the inclined magnets of the first rotor pole shown in FIG. 5.

The outermost extent of the opposing inclined third magnets 10C-2, 10C-3 in each rotor 9-n is defined with reference to an outer third central angle A3O. The outer third central angle A3O is measured between two third radial lines r3O coincident with the opposing outer ends of the inclined third magnets 10C-2, 10C-3. As shown in FIG. 10, the outer third central angle A3O is the included angle between the third radial lines r3O extending from the longitudinal axis X of the rotor core 6 and coincident with the outer ends 10C-2O, 10C-3O of the inclined third magnets 10C-2, 10C-3. In the present embodiment, the third radial lines r3O are coincident with the outboard corners of the inclined third magnets 10C-2, 10C-3 (i.e. the corners disposed closest to the quadrature axes qr-n).

The outer third central angle A3O is defined by the equation:

$$\frac{150}{p} < A3O < \frac{170}{p}$$

The rotor core 5 comprise four (4) pole pairs and the resulting outer third central angle A3O is in the range 37.5° to 42.5°, inclusive. The upper and lower limits of the outer third central angle A3O are illustrated in FIG. 9. The outer third central angle A3O may more precisely be defined by the equation:

$$\frac{160}{p} < A3O < \frac{168}{p}$$

This refined equation defines the outer third central angle A3O in the range 40° to 42°, inclusive. The outer third central angle A3O may be defined as 41°±1°. The outer third central angle A3O of the inclined third magnets 10C-2, 10C-3 illustrated in FIG. 9 is approximately 40°.

Figure 11:
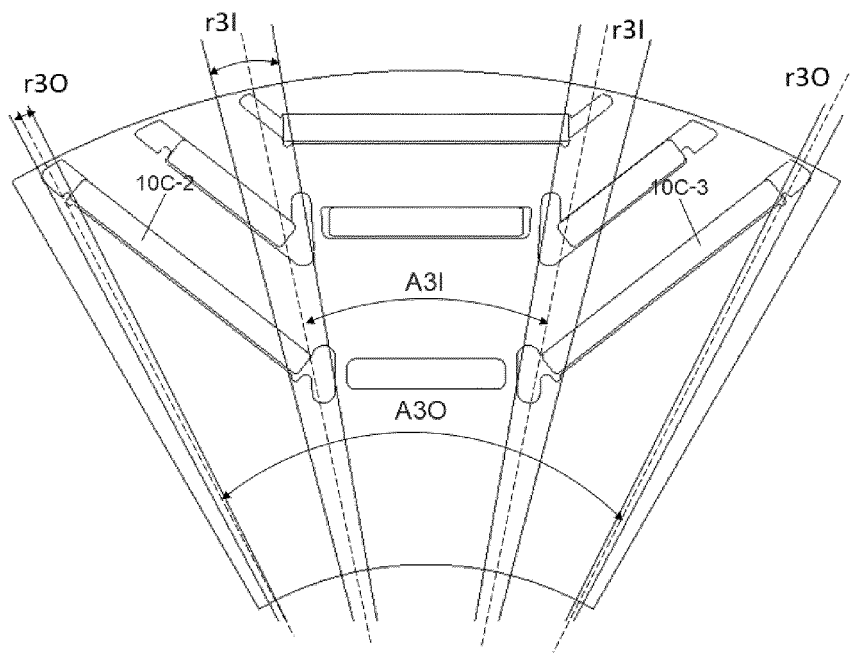
FIG. 11 shows inner and outer central angles defined by the inclined magnets of the first rotor pole shown in FIG. 7.

As shown in FIG. 11, this approach is applicable also to a rotor core 6 having six (6) rotor poles 9-n, i.e. having three (3) rotor pairs (p=3). The application of the above equation for a rotor having six (6) rotor poles 9-n defines the outer third central angle A3O in the range to 56.7°. The refined equation defines the outer third central angle A3O in the range 53.3° to 56°. The outer third central angle A3O may be 54.7°±1.3°. The outer third central angle A3O in the arrangement illustrated in FIG. 11 is approximately 54°.

The innermost extent of the opposing inclined third magnets 10C-2, 10C-3 in each rotor 9-n is defined with reference to an inner third central angle A3I, as shown in FIG. 10. The inner third central angle A3I is less than the first central angle A1 (A3I<A1). The inner third central angle A3I is measured between two inner third radial lines r3I coincident with the opposing inner ends of the inclined third magnets 10C-2, 10C-3. As shown in FIG. 10, the inner third central angle A3I is the included angle between the third radial lines r3I extending from the longitudinal axis X of the rotor core 6 and coincident with the inner ends 10C-2O, 10C-3O of the inclined third magnets 10C-2, 10C-3. In the present embodiment, the third radial lines r3I are coincident with the inboard corners of the inclined third magnets 10C-2, 10C-3 (i.e. the corners disposed closest to the direct axis dr-n).

The inner third central angle A3I is defined by the equation:

$$\frac{60}{p} < A3I < \frac{88}{p}$$

The rotor core 5 comprise four (4) pole pairs and the resulting inner third central angle A3I is in the range 15° to 22°, inclusive. The inner third central angle A3I may be defined as 18.5°±3.5°. The upper and lower limits of the inner third central angle A3I are illustrated in FIG. 11. The inner third central angle A3I may more precisely be defined by the equation:

$$\frac{70}{p} < A3I < \frac{80}{p}$$

This refined equation defines the inner third central angle A3I in the range 17.5° to 20°, inclusive. The inner third central angle A3I of the inclined third magnets 10C-2, 10C-3 illustrated in FIG. 10 is approximately 16°.

As shown in FIG. 11, this approach is applicable also to a rotor core 6 having six (6) rotor poles 9-n, i.e. having three (3) rotor pairs (p=3). The application of the above equation for a rotor having six (6) rotor poles 9-n defines the inner third central angle A3I in the range 20° to 30° inclusive. The inner third central angle A3I may be 24.7°±4.7°. The refined equation defines the inner third central angle A3I in the range 23.3° to 26.6°. The outer third central angle A3O in the arrangement illustrated in FIG. 11 is approximately 24°.

The inner and outer third radial lines r3I, r3O define the extent of two third circular sectors in which the inclined third magnets 10C-2, 10C-3 are located. The third circular sectors are disposed on opposing first and second sides of the direct axis dr-n in a non-overlapping arrangement. The third circular sectors are symmetrical about the direct axis dr-n. With respect to the direct axis dr-n, the inboard and outboard extremities of the inclined third magnets 10C-2, 10C-3 are coincident with the boundaries of the respective circular sectors. The angular extent of each third circular sector is defined by the difference between the inner third central angle A3I and the outer third central angle A3O. The angular position of the third circular sectors relative to the direct axis dr-n is defined by the inner third central angle A3I. The inner third central angle A3I defines an inner limit (boundary) of the regions in each pole 9-n inside of which the inclined third magnets 10C-2, 10C-3 are disposed. The outer third central angle A3O represents an outer limit (boundary) of the regions in each rotor pole 9-n inside of which the inclined third magnets 10C-2, 10C-3 are disposed. In a variant, the inner boundary of the third circular sectors S1, S2 may be defined by a boundary extending parallel to the direct axis dr-n and coincident with (or inset from) the outer edges 10A-1L, 10A-2R of the central first magnet 10A-1.

The transverse axis Y1 of each of the inclined third magnets 10C-2, 10C-3 extends at a third acute angle α3 relative to the direct axis dr-n. An included angle V3 is defined between the transverse axes Y1 of the inclined third magnets 10C-2, 10C-3 (V3=2*α3). A range of values for the included angle V3 are defined by the following equation:

$$\frac{270}{p} < V3 < \frac{450}{p}$$

Figure 12:
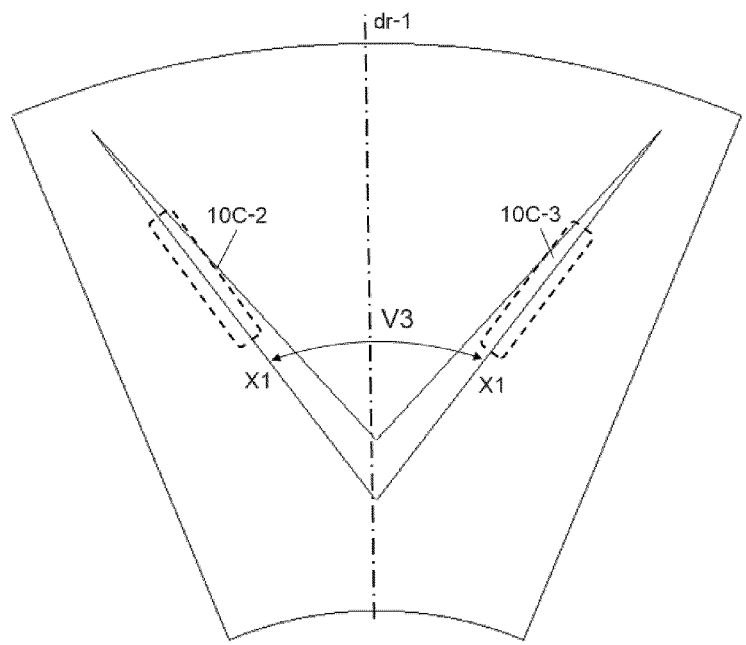
FIG. 12 shows an included angle between the transverse axes of the inclined magnets of the first rotor pole shown in FIG. 5.

The included angle V3 for a rotor core 6 having eight (8) poles is in the range 67.5° to 112.5° inclusive. The included angle V3 of the inclined third magnets 10C-2, 10C-3 may be 80°±5°. The included angle V3 of the inclined third magnets 10C-2, 10C-3 may be 84°±4°; or may be 84°±2°. The included angle V3 of the inclined third magnets 10C-2, 10C-3 in the arrangement illustrated in FIG. 12 is approximately 84°. It will be understood that the inclined third magnets 10C-2, 10C-3 are disposed within the third circular sectors S1, S2 outlined above in this inclined configuration.

Figure 13:
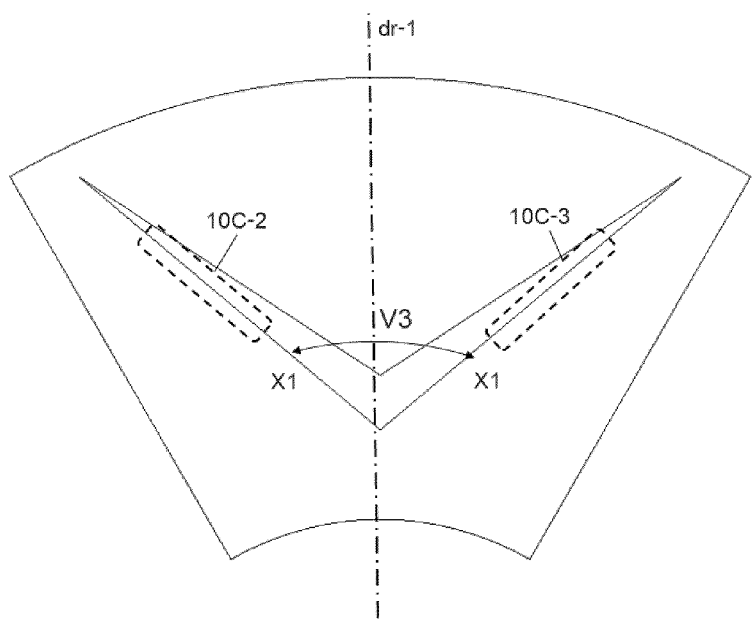
FIG. 13 shows an included angle between the transverse axes of the inclined magnets of the first rotor pole shown in FIG. 7.

As shown in FIG. 13, this approach is applicable also to a rotor core 6 having six (6) rotor poles 9-n, i.e. having three (3) rotor pairs (p=3). The application of the above equation for a rotor having six (6) rotor poles 9-n defines the included angle V3 in the range 90° to 150° inclusive. A typical included angle V3 would be in the range 100° to 120° inclusive. In a preferred arrangement, the included angle V3 may be 106.7°±6.7° inclusive. In the arrangement illustrated in FIG. 13, the included angle V3 is approximately 104°.

The included angle V3 may more precisely be defined by the equation:

$$\frac{300}{p} < V3 < \frac{340}{p}$$

This refined equation defines the included angle V3 for a rotor core 6 having eight (8) poles in the range 75° to 85°, inclusive. The included angle V3 for a rotor core 6 having six (6) poles is in the range 100° to 113.3° inclusive.

The topology of the rotor core 6 in the present embodiment is substantially unchanged from that of the rotor core 6 in the previous embodiment. The location, size and orientation of the central first magnet 10A-1 and the inclined third magnets 10C-2, 10C-3 are substantially unchanged. Unless indicated to the contrary (or otherwise incompatible), the description of the topology of the rotor core 6 is applicable to the different embodiments.

It will be appreciated that various modifications may be made to the embodiment(s) described herein without departing from the scope of the appended claims.

The rotor core 6 has been described herein as comprising three layers A, B, C of permanent magnets 10. It will be understood that one the rotor core 6 may comprise less than three (3) layers of permanent magnets. The rotor core 6 may have two (2) layers of the permanent magnets 10. For example, the second (intermediate) layer B may be omitted. At least in certain embodiments, the rotor core 6 may comprise more than three (3) layers.

The invention claimed is:

1. A rotor assembly for an electric machine, the rotor assembly comprising a rotor and a plurality of magnets, the plurality of magnets being configured to form a plurality of rotor poles and each rotor pole having a central pole axis extending in a radial direction from a longitudinal axis of the rotor;

wherein each rotor pole comprises:
a first magnet layer comprising one or more first magnet, the one or more first magnet comprising a central first magnet having a first transverse axis disposed substantially perpendicular to the central pole axis; and
a second magnet layer radially inset from the first magnet layer and comprising two or more second magnets, the two or more second magnets comprising a pair of inclined second magnets each having a first transverse axis extending at an acute angle to the central pole axis;
wherein, in relation to the central pole axis, a portion of each of the inclined second magnets is disposed inboard of an end of the central first magnet to form an overlapping arrangement, wherein a first central angle (A1) is defined by an equation:

$$A1 < \frac{1}{2} \cdot \frac{360}{2p}$$

where A1 is the first central angle; and p is a number of pole pairs in a rotor core.

2. The rotor assembly as claimed in claim 1, wherein the central first magnet comprises opposing first and second ends, wherein the first central angle (A1) is formed between two first radial lines extending from the longitudinal axis and coincident with the opposing first and second ends respectively of the central first magnet; the first central angle (A1) being further defined by an equation:

$$A1 > \frac{1}{4} \cdot \frac{360}{2p}.$$

3. The rotor assembly as claimed in claim 1, wherein the inclined second magnets have transverse axes oriented at an included angle (V3) relative to each other, the included angle (V3) being defined by an equation:

$$\frac{270}{p} < V3 < \frac{450}{p}$$

where V3 is the included angle; and p is a number of pole pairs in a rotor core.

4. The rotor assembly as claimed in claim 3, wherein the included angle (V3) is defined by an equation:

$$\frac{300}{p} < V3 < \frac{340}{p}$$

where V3 is the included angle; and p is the number of pole pairs in the rotor core.

5. The rotor assembly as claimed in claim 1, wherein each rotor pole comprises a third magnet layer, the third magnet layer being disposed between the first and second magnet layers.

6. The rotor assembly as claimed in claim 5, wherein the third magnet layer comprises two or more third magnets, the two or more third magnets comprising a pair of inclined third magnets each having a first transverse axis extending at an acute angle to the central pole axis.

7. The rotor assembly as claimed in claim 6, wherein, in relation to the central pole axis, a portion of each of the inclined third magnets is disposed inboard of an end of the one or more central first magnet to form an overlapping arrangement.

8. A vehicle comprising an electric machine comprising the rotor assembly as claimed in claim 1.

9. The rotor assembly as claimed in claim 1, wherein each inclined second magnet comprises an inner end, wherein an inner second central angle (A3I) is formed between two inner radial lines extending from the longitudinal axis and coincident with the inner ends of the inclined second magnets; the inner second central angle (A3I) being defined by an equation:

$$A3I < \frac{88}{p}$$

where A3I is the inner second central angle; and p is a number of pole pairs in a rotor core.

10. The rotor assembly as claimed in claim 1, wherein each inclined second magnet comprises an outer end, wherein an outer second central angle (A3O) is formed between two outer radial lines extending from the longitudinal axis and coincident with the outer ends of the inclined second magnets; the outer second central angle (A3O) being defined by an equation:

$$A3O < \frac{170}{p}$$

where A3O is the outer second central angle; and p is a number of pole pairs in a rotor core.

11. A rotor assembly for an electric machine, the rotor assembly comprising a rotor and a plurality of magnets, the plurality of magnets being configured to form a plurality of rotor poles and each rotor pole having a central pole axis extending in a radial direction from a longitudinal axis of the rotor;

wherein each rotor pole comprises:

a first magnet layer comprising one or more first magnet, the one or more first magnet comprising a central first magnet having a first transverse axis disposed substantially perpendicular to the central pole axis; and a second magnet layer radially inset from the first magnet layer and comprising two or more second magnets, the two or more second magnets comprising a pair of inclined second magnets each having a first transverse axis extending at an acute angle to the central pole axis;

wherein, in relation to the central pole axis, a portion of each of the inclined second magnets is disposed inboard of an end of the central first magnet to form an overlapping arrangement, wherein an inner second central angle (A3I) is defined by an equation:

$$\frac{60}{p} < A3I$$

where A3I is the inner second central angle; and p is a number of pole pairs in a rotor core.

12. The rotor assembly as claimed in claim 11, wherein each inclined second magnet comprises an inner end, wherein the inner second central angle (A3I) is formed between two inner radial lines extending from the longitudinal axis and coincident with the inner ends of the inclined second magnets; the inner second central angle (A3I) being further defined by an equation:

$$A3I < \frac{88}{p}.$$

13. The rotor assembly as claimed in claim 12, wherein an inner third central angle A3I is less than a first central angle A1.

14. The rotor assembly as claimed in claim 11, wherein an inner third central angle A3I is less than a first central angle A1.

15. The rotor assembly as claimed in claim 11, wherein the central first magnet comprises opposing first and second ends, wherein a first central angle (A1) is formed between two first radial lines extending from the longitudinal axis and coincident with the opposing first and second ends respectively of the central first magnet; the first central angle (A1) being defined by an equation:

$$A1 > \frac{1}{4} \cdot \frac{360}{2p}$$

where A1 is the first central angle; and p is a number of pole pairs in a rotor core.

16. The rotor assembly as claimed in claim 11, wherein each inclined second magnet comprises an outer end, wherein an outer second central angle (A3O) is formed between two outer radial lines extending from the longitudinal axis and coincident with the outer ends of the inclined second magnets; the outer second central angle (A3O) being defined by an equation:

$$A3O < \frac{170}{p}$$

where A3O is the outer second central angle; and p is a number of pole pairs in a rotor core.

17. A rotor assembly for an electric machine, the rotor assembly comprising a rotor and a plurality of magnets, the plurality of magnets being configured to form a plurality of rotor poles and each rotor pole having a central pole axis extending in a radial direction from a longitudinal axis of the rotor;

wherein each rotor pole comprises:

a first magnet layer comprising one or more first magnet, the one or more first magnet comprising a central first magnet having a first transverse axis disposed substantially perpendicular to the central pole axis; and a second magnet layer radially inset from the first magnet layer and comprising two or more second magnets, the two or more second magnets comprising a pair of inclined second magnets each having a first transverse axis extending at an acute angle to the central pole axis;

wherein, in relation to the central pole axis, a portion of each of the inclined second magnets is disposed inboard of an end of the central first magnet to form an overlapping arrangement, wherein an outer second central angle (A3O) is defined by an equation:

$$\frac{150}{p} < A3O$$

where A3O is the outer second central angle; and p is a number of pole pairs in a rotor core.

18. The rotor assembly as claimed in claim 17, wherein each inclined second magnet comprises an outer end, wherein the outer second central angle (A3O) is formed between two outer radial lines extending from the longitudinal axis and coincident with the outer ends of the inclined second magnets; the outer second central angle (A3O) being defined by an equation:

$$A3O < \frac{170}{p}.$$

19. The rotor assembly as claimed in claim 17, wherein the central first magnet comprises opposing first and second ends, wherein a first central angle (A1) is formed between two first radial lines extending from the longitudinal axis and coincident with the opposing first and second ends respectively of the central first magnet; the first central angle (A1) being defined by an equation:

$$A1 > \frac{1}{4} \cdot \frac{360}{2p}$$

where A1 is the first central angle; and p is a number of pole pairs in a rotor core.

20. The rotor assembly as claimed in claim 17, wherein each inclined second magnet comprises an inner end, wherein an inner second central angle (A3I) is formed between two inner radial lines extending from the longitudinal axis and coincident with the inner ends of the inclined second magnets; the inner second central angle (A3I) being defined by an equation:

$$A3I < \frac{88}{p}$$

where A3I is the inner second central angle; and p is a number of pole pairs in a rotor core.

* * * * *